US011401006B2

(12) United States Patent
Braedt

(10) Patent No.: US 11,401,006 B2
(45) Date of Patent: Aug. 2, 2022

(54) REAR DERAILLEUR

(71) Applicant: SRAM DEUTSCHLAND GmbH, Schweinfurt (DE)

(72) Inventor: Henrik Braedt, Hambach (DE)

(73) Assignee: SRAM Deutschland GmbH, Schweinfurt (DE)

( * ) Notice: Subject to any disclaimer, the term of this patent is extended or adjusted under 35 U.S.C. 154(b) by 422 days.

(21) Appl. No.: 16/547,236

(22) Filed: Aug. 21, 2019

(65) Prior Publication Data
US 2020/0062343 A1 Feb. 27, 2020

(30) Foreign Application Priority Data

Aug. 22, 2018 (DE) .................... 10 2018 214 218.1

(51) Int. Cl.
*B62M 9/127* (2010.01)
*B62M 9/124* (2010.01)
*B62M 9/126* (2010.01)
*B62M 9/125* (2010.01)

(52) U.S. Cl.
CPC ............ *B62M 9/127* (2013.01); *B62M 9/124* (2013.01); *B62M 9/125* (2013.01); *B62M 9/126* (2013.01)

(58) Field of Classification Search
CPC ................. B62M 9/121; B62M 9/124; B62M 2009/12406; B62M 2009/12413; B62M 9/1242; B62M 9/1244; B62M 9/125; B62M 9/126; B62M 9/127
See application file for complete search history.

(56) References Cited

U.S. PATENT DOCUMENTS

| | | | | |
|---|---|---|---|---|
| 2,010,248 A * | 8/1935 | Winkler | ................. | B62M 9/124 474/80 |
| 3,979,962 A * | 9/1976 | Kebsch | ................... | B62M 25/04 474/82 |
| 4,002,080 A * | 1/1977 | Huret | ................... | B62M 9/1242 474/82 |
| 4,226,132 A * | 10/1980 | Nagano | ................ | B62M 9/1242 474/82 |
| 4,269,601 A * | 5/1981 | Nagano | ................ | B62M 9/1248 474/134 |
| 4,306,871 A * | 12/1981 | Nagano | .................. | B62M 9/127 474/82 |
| 4,443,208 A * | 4/1984 | Kozakae | .............. | B62M 9/1246 474/82 |
| 4,494,944 A * | 1/1985 | Coue | ...................... | B62M 9/127 474/82 |

(Continued)

FOREIGN PATENT DOCUMENTS

| | | | | |
|---|---|---|---|---|
| CA | 2545656 A1 * | 1/2007 | ............ | B62M 9/126 |
| DE | 19915334 | 10/2000 | | |

(Continued)

*Primary Examiner* — Michael R Mansen
*Assistant Examiner* — Raveen J Dias

(57) ABSTRACT

A bicycle derailleur mechanism is provided which accommodates larger radial spacing and/or smaller radial spacing having a non-uniform value over the respective winding region. The derailleur mechanism cable pull transmission device may provide over its rotational angular range about the rotational axis, which is effective during operation, a variable transmission ratio as a function of the rotational position of the cable pull transmission device relative to the base component.

22 Claims, 8 Drawing Sheets

(56) References Cited

U.S. PATENT DOCUMENTS

| | | | | |
|---|---|---|---|---|
| 4,789,379 | A * | 12/1988 | Ozaki | B62M 9/1242 |
| | | | | 474/82 |
| 5,102,372 | A * | 4/1992 | Patterson | B62K 23/04 |
| | | | | 474/80 |
| 5,380,253 | A * | 1/1995 | Iwasaki | B62M 9/1242 |
| | | | | 474/80 |
| 5,533,937 | A * | 7/1996 | Patterson | B62M 9/125 |
| | | | | 474/80 |
| 5,624,334 | A * | 4/1997 | Lumpkin | B62M 9/127 |
| | | | | 474/79 |
| 5,857,932 | A * | 1/1999 | Sugimoto | B62M 25/02 |
| | | | | 474/82 |
| 5,904,629 | A * | 5/1999 | Oka | B62M 25/02 |
| | | | | 474/78 |
| RE36,830 | E * | 8/2000 | Lumpkin | B62M 25/02 |
| | | | | 474/79 |
| 6,793,598 | B1 * | 9/2004 | Savard | B62M 9/1248 |
| | | | | 474/80 |
| 7,104,908 | B2 * | 9/2006 | Nagano | B62M 9/1242 |
| | | | | 474/82 |
| 8,419,573 | B2 * | 4/2013 | Yamaguchi | B62M 9/127 |
| | | | | 267/155 |
| 8,777,788 | B2 * | 7/2014 | Kawakami | B62M 9/1344 |
| | | | | 74/489 |
| 10,106,224 | B2 * | 10/2018 | Duweling | B62M 9/137 |
| 2007/0021248 | A1 * | 1/2007 | Shahana | B62M 9/16 |
| | | | | 474/83 |
| 2007/0026985 | A1 * | 2/2007 | Yamaguchi | B62M 9/1242 |
| | | | | 474/82 |
| 2011/0160013 | A1 * | 6/2011 | Wehage | B62M 9/1244 |
| | | | | 474/80 |
| 2018/0265169 | A1 * | 9/2018 | Braedt | B62M 9/125 |
| 2019/0291818 | A1 * | 9/2019 | Braedt | B62M 9/12 |
| 2020/0198728 | A1 * | 6/2020 | Braedt | B62K 25/02 |
| 2020/0298933 | A1 * | 9/2020 | Braedt | B62K 25/02 |
| 2021/0054929 | A1 * | 2/2021 | Braedt | B62M 9/1242 |

FOREIGN PATENT DOCUMENTS

| | | | | |
|---|---|---|---|---|
| EP | 0036317 | A2 * | 9/1981 | B62M 9/127 |
| EP | 1031503 | A2 * | 8/2000 | B62M 9/127 |
| EP | 1099620 | A2 * | 5/2001 | B62M 9/125 |

* cited by examiner

REAR DERAILLEUR

This application claims priority to, and/or the benefit of, German patent application DE 10 2018 214 218.1, filed Aug. 22, 2018, the contents of which are incorporated herein in their entirety.

FIELD OF INVENTION

The invention relates to a bicycle rear derailleur, and specifically to a bicycle rear derailleur having a cable pull transmission device and/or other features.

BACKGROUND

A derailleur is disclosed in DE 199 15 334 A1. The known derailleur uses two concentric deflection pulleys which are rotatably arranged on the base component about the rotational axis. Two different embodiments are disclosed in DE 199 15 334 A1, namely one embodiment in which the gear shift cable pull portion and the displacement cable pull portion are portions of one the same physical cable which are configured on different longitudinal portions of one cable, and a further embodiment according to which each of the aforementioned portions is configured on a separate cable which in each case is connected fixedly in terms of rotation by one of its ends to the deflection pulley assigned to the respective cable pull portion.

The deflection pulleys disclosed in DE 199 15 334 A1 have a uniform radial spacing from the rotational axis in the relevant winding region for a gear shift operation on a bicycle. The transmission ratio provided by the cable pull transmission device in the respective operating state, i.e. in the respective rotational position of the cable pull transmission device, depends on the ratio of the respective radial spacing of the location of the gear shift deflection contour and the displacement deflection contour at which the cable pull portion assigned to the respective deflection contour runs away from the cable pull transmission device. For the gear shift deflection contour this is the end of the gear shift winding region located closer to the cable pull securing formation, and for the displacement deflection contour this is the end of the displacement winding region located closer to the movement coupling device. Depending on the respective rotational position of the cable pull transmission device, the winding regions of the gear shift deflection contour and the displacement deflection contour are of different sizes, wherein generally the sum of the two winding regions measured in the winding angle about the rotational axis remains approximately constant irrespective of the rotational position of the cable pull transmission device, since the unwinding of the one cable pull portion from the one deflection contour effects a winding-up movement of the respective other cable pull portion onto the respective other deflection contour and vice-versa.

With an increasing number of pinions on the rear wheel axis and thus gear stages of the rear wheel derailleur, the translatory movement path of the chain guide arrangement increases, which is necessary in order to arrange a chain guide plane of the chain guide arrangement in a coplanar manner with a central plane of each pinion at right angles to the rear wheel axis. This coplanar arrangement of a chain guide plane of the chain guide arrangement with the aforementioned pinion central plane has to be possible for all of the pinions of a rear wheel pinion arrangement, so that the gear stage range which is provided is able to be fully utilized.

It should also be taken into account here that the pinion central planes of the pinions are arranged approximately equidistant. The chain guide arrangement, therefore, always has to cover approximately the same displacement path from any coplanar arrangement relative to the pinion central plane of a pinion to the next possible axial coplanar arrangement. In this case, the required gear shift movement of the gear shift cable pull portion, starting from a gear shift device, for example, on the handlebars of the bicycle, is also designed to remain approximately constant. In this case, however, it may arise that, due to its own kinematics, the movement coupling device which displaceably connects the chain guide arrangement in a translatory manner to the base component requires displacement paths of different lengths as a function of its respective operating position, in order to displace in a translatory manner the chain guide plane of the chain guide arrangement in uniform increments.

It is, therefore, the object of embodiments of the present invention to improve the derailleur mechanism mentioned in the introduction such that even if the displacement paths of the movement coupling device have to be of different sizes as a function of their operating position, substantially the same gear shift path of the gear shift cable pull portion always has to be covered in order to effect a predetermined substantially uniform displacement increment of the chain guide arrangement. Thus the bicycle rider is always able to carry out the same gear shift actuation on the gear shift actuation device, irrespective of which gear stages on the rear wheel the rider wishes to change between.

SUMMARY

In an embodiment, a derailleur mechanism for a rear wheel derailleur of a bicycle is provided. The derailleur mechanism may include a base component which is configured to be immovably fastened to a bicycle relative to the bicycle frame during its intended gear shift operation, a movement coupling device and a chain guide arrangement which is displaceably coupled to the base component by means of the movement coupling device in a translatory manner relative to the base component, a cable pull securing formation which is configured for supporting a cable sheath and for passing through a cable of a gear shift cable pull portion running from a gear shift actuating device to the derailleur mechanism, and a cable pull transmission device which is rotatably arranged about a rotational axis on the base component. The cable pull transmission device has a gear shift deflection contour which surrounds the rotational axis with a larger radial spacing and has a displacement deflection contour which surrounds the rotational axis with a smaller radial spacing, wherein the gear shift deflection contour and the displacement deflection contour are connected together for common rotational movement about the rotational axis. The gear shift deflection contour is configured to receive the gear shift cable pull portion so as to bear along a gear shift winding region and the displacement deflection contour is configured to receive a displacement cable pull portion running between the displacement deflection contour and the movement coupling device so as to bear along a displacement winding region. The larger radial spacing or the smaller radial spacing has a non-uniform value over the respective winding region, so that the cable pull transmission device, over its rotational angular range about the rotational axis which is effective during operation, provides a variable transmission ratio as a function of the rotational position of the cable pull transmission device relative to the base component.

BRIEF DESCRIPTION OF THE DRAWINGS

The present invention will be explained in more detail below with reference to the attached drawings, in which.

DETAILED DESCRIPTION OF THE DRAWINGS

Figure 1:
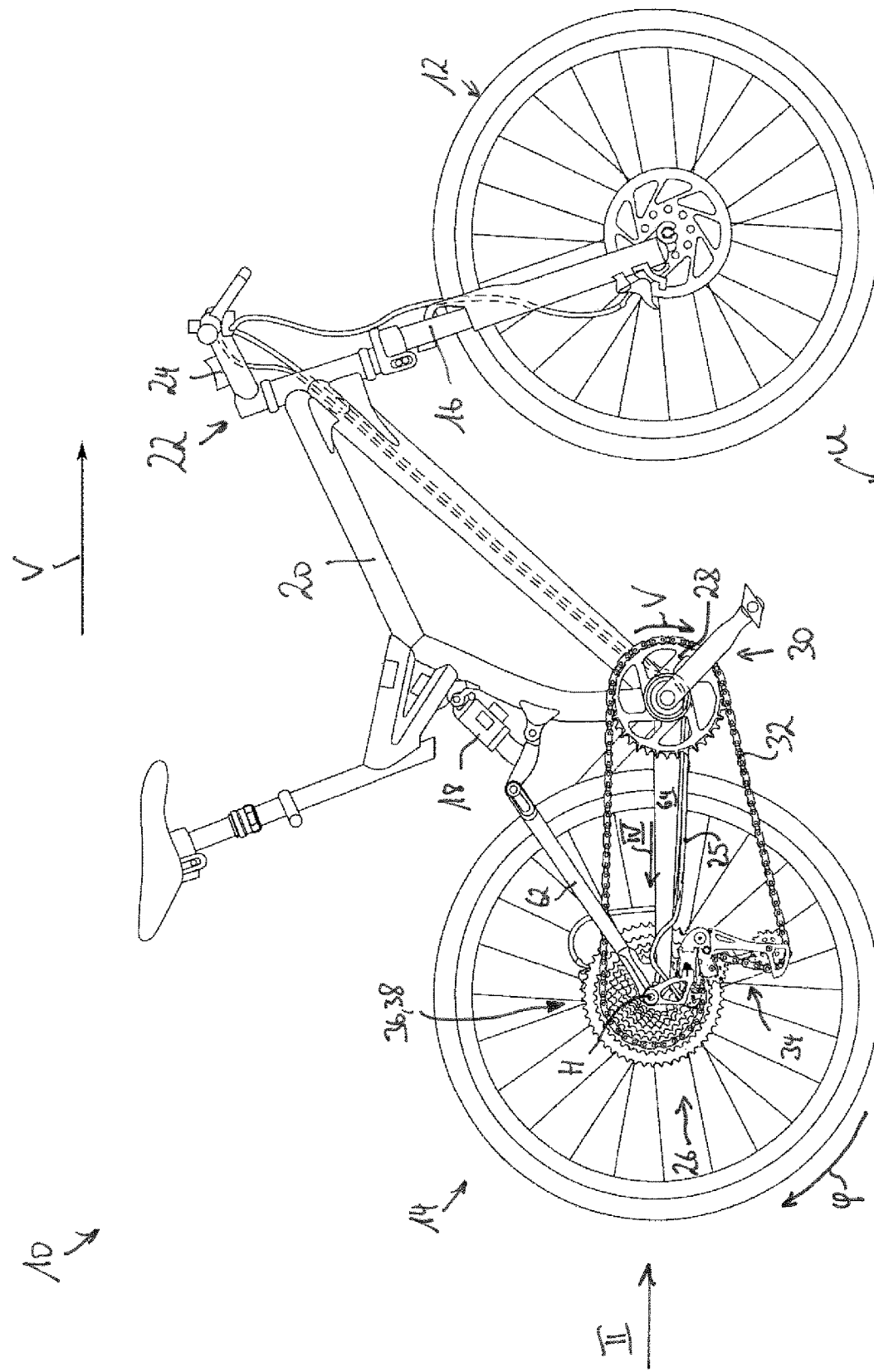
FIG. 1 shows a rough schematic side view of a bicycle with the derailleur mechanism according to an embodiment.

Embodiments of the present invention achieve the object on a derailleur mechanism of the type mentioned in the introduction, by the larger radial spacing or/and the smaller radial spacing having a non-uniform value over the respective winding region, so that the cable pull transmission device over its rotational angular range about the rotational axis, which is effective during operation, provides a variable transmission ratio as a function of the rotational position of the cable pull transmission device relative to the base component.

In contrast to the derailleur disclosed in DE 199 15 334 A1, the transmission ratio provided by the cable pull transmission device is no longer constant over the rotational angular range which is effective during operation of the cable pull transmission device, but has different values as a function of the rotational position of the cable pull transmission device.

In detail, the ratio between the radial spacing of the gear shift deflection contour at the location of the end of the gear shift winding region located closer to the cable pull securing formation from the rotational axis, and the radial spacing of the displacement deflection contour at the location of the end of the displacement winding region located closer to the movement coupling device from the rotational axis, defines the transmission ratio of the cable pull transmission device.

It should be made clear at this point that the aforementioned translatory movement of the chain guide arrangement relative to the base component is not necessarily a linear movement and in reality in most cases will follow a curvilinear path. "Translatory" is the movement of the chain guide arrangement when it takes place substantially without rotation relative to a rotational axis located in the chain guide plane of the chain guide arrangement. As is set forth below, for advantageously reducing a chain oblique position between the derailleur mechanism and a front chain leaf arrangement which is coupled in terms of movement to pedal cranks, a slight rotation of the chain guide arrangement may be permitted about a rotational axis located in the chain guide plane of the chain guide arrangement. This rotation, starting from an orientation of the chain guide plane at right angles to the rear wheel axis, should not be greater than 9° in any direction. The chain guide arrangement may have a moving part coupled to the movement coupling device and a chain guide connected to the moving part. A rotation of the chain guide relative to the moving part about a rotational axis at right angles to its chain guide plane is not only possible but generally desired for tensioning the bicycle chain passing through the rear derailleur. The chain guide plane of the chain guide arrangement in this case is generally defined by a chain guide roller which is rotatably mounted on the chain guide, namely by a central plane of the chain guide roller which is at right angles to the rotational axis of the chain guide roller and which intersects a sprocket of the chain guide roller in its axial centre.

A tensioning roller may also be arranged with a spacing from the chain guide roller in the chain guide plane of the chain guide arrangement. The chain guide roller in this case is that of the two rollers which is located closer to the movement coupling device during the gear shift operation. The chain guide roller and the tensioning roller thus rotate about rotational axes which are arranged in parallel but at a spacing from one another.

It should also be mentioned that the cable pull portions mentioned in the introduction: the gear shift cable pull portion and the displacement cable pull portion, are primarily not a necessary component of the derailleur mechanism and are also not necessary for determining whether a derailleur mechanism uses all of the features of the main claim. The end of the gear shift winding region located closer to the cable pull securing formation is produced from a tangent relative to the gear shift deflection contour running to a cable through-guidance formation of the cable pull securing formation. The cable through-guidance formation in this case permits a through-passage of the cable of the gear shift cable pull portion but holds back the cable sheath thereof. This tangent is also able to be determined without the presence of the gear shift cable pull portion. As a result, the location of the end of the gear shift winding region, which is relevant for determining the transmission ratio of the cable pull transmission device, is also able to be determined without the gear shift cable pull portion. In a particularly advantageous case in practice, the gear shift and displacement winding region in each case extend over an angular range of between 140° and 150°, in particular between 143° and 147°.

The same applies to the end of the displacement winding region located closer to the movement coupling device. This end is located where the displacement cable pull portion runs away from the displacement winding contour toward the movement coupling device. This location is also able to be determined by a tangent to the displacement winding contour which runs from the displacement winding contour to the closest structure which is movable together with the movement coupling device and which is configured for receiving the displacement cable pull portion coming from the displacement winding contour.

In principle, in the present application cable pull paths which run from the cable pull transmission device to a gear shift actuation device on the handlebars, or generally in the gripping region of a bicycle rider, are denoted by the prefix "gear shift" since these cable paths transmit an intention of the bicycle rider to carry out a gear shift on the derailleur mechanism.

Cable paths which extend from the cable pull transmission device to the movement coupling device are also identified by the term "displacement" since a movement of this cable path directly effects a displacement of the chain guide arrangement.

It also applies to the present derailleur mechanism that the sum of the winding angle of the gear shift winding region and the displacement winding region, measured in angular units, is approximately constant in the rotational angular region of the cable pull transmission device pertaining to a gear shift operation of the derailleur mechanism. This means that the unwinding of the one cable pull portion from the deflection contour assigned thereto corresponds to a winding of the respective other cable pull portion onto the respective other deflection contour assigned thereto and vice-versa.

The branches of the gear shift cable pull portion running away from the respective deflection contour in the direction of the cable pull transmission device, on the one hand, and the displacement cable pull portion, on the other hand, are located on different sides of the rotational axis.

The variable transmission ratio of the cable pull transmission device may be provided in a structurally simple manner by at least one deflection contour, from the gear shift deflection contour and the displacement deflection contour, extending in a non-circular manner about the rotational axis. In order to use the constructional space in a manner which is as effective as possible and to avoid undesired take-up of constructional space, the smaller of the two deflection contours is configured eccentrically relative to the rotational axis. Therefore, for implementing the variable transmission ratio as a function of the rotational position, it may be provided that the displacement deflection contour extends eccentrically about the rotational axis such that the radial spacing of the displacement deflection contour from the rotational axis, starting from a minimum displacement winding region, with an increasing winding angle of the displacement winding region initially reduces to a minimum value of the smaller radius, and starting therefrom becomes larger again, and in some embodiments continuously larger until reaching the maximum displacement winding region. The larger spacing of the gear shift deflection contour from the rotational axis of the cable pull transmission device may be constant in the relevant rotational region of the gear shift deflection contour during operation, as is described in more detail below.

The location of the minimum value of the smaller radius may be located closer to a longitudinal end of the displacement winding region located more remotely from the movement coupling device, than to the longitudinal end of the displacement winding region located closer to the movement coupling device. As a result, an advantageously asymmetrical gear shift kinematics of the movement coupling device may be achieved. If the maximum value of the smaller radius may be located at the longitudinal end of the displacement winding region which is located closer to the movement coupling device.

In principle, the movement coupling device may be any device which displaces the chain guide arrangement in a translatory manner relative to the base component. In practical bicycle technology, however, it has proved advantageous for many years that the movement coupling device comprises a parallelogram connecting rod gear system. This gear system has two parallelogram connecting rods which in each case have an articulated region on the base component side and an articulated region on the chain guide side, wherein each parallelogram connecting rod is pivotably connected to the base component at its articulated region on the base component side about a base-connecting rod axis, and at its articulated region on the chain guide side is pivotably connected to the chain guide arrangement, in particular to the moving part thereof, about a chain guide connecting rod axis. The four connecting rod axes of the parallelogram connecting rod gear system form parallel edges of a virtual parallelepiped.

Even if the spacing of the pairs of connecting rod axes are preferably of equal size, and thus the parallelepiped has an exact parallelogram as a basic surface, such an exact parallelogram shape of the parallelepiped basic surface does not have to be absolutely maintained. Thus connecting rod axis spacing, to be measured in directions parallel to one another, may have slightly different sizes. Thus it may be achieved that, when brought increasingly close to its extreme operating positions which are the positions of the smallest and the largest gear stage on the rear wheel, the chain guide arrangement rotates slightly toward a front chain leaf arrangement in the vicinity of the pedal cranks of the bicycle bearing the derailleur mechanism. Thus an oblique position of the bicycle chain between front chain leaf arrangement and rear derailleur mechanism may be minimized. For example, to this end, the spacing of the chain guide connecting rod axes may have a slightly different spacing, in particular a shorter spacing, than the base-connecting rod axes.

A longitudinal end of the displacement cable pull portion located closer to the movement coupling device is coupled to one of the parallelogram connecting rods of the parallelogram connecting rod gear system during the gear shift operation. This parallelogram connecting rod is denoted hereinafter as the "master connecting rod". The respective other parallelogram connecting rod is coupled via the base component and the to the master connecting rod for common movement.

In order to ensure that the orientation of the cable end of the displacement cable pull portion coupled to the master connecting rod is independent of the operating position of the parallelogram connecting rod gear system, relative to the master connecting rod, and thus a constant force and movement is applied to the master connecting rod irrespective of the operating position of the parallelogram connecting rod gear system, the derailleur mechanism may have a cam disc which is connected to one of the parallelogram connecting rods, as the master connecting rod, for common movement, wherein the cam disc is configured to guide a cable end of the displacement cable pull portion coupled to the master connecting rod for common movement, in the direction away from the parallelogram connecting rod along a bearing region so as to bear against a bearing track configured on the cam disc.

The cable end which is coupled to the master connecting rod may be secured directly to the cam disc, namely may be clamped thereto, wherein the cam disc which is coupled to the master connecting rod for common movement, as a force and movement transmission element effects a coupling of the cable end to the master connecting rod. For achieving an advantageously small number of components, a clamping force component, namely a clamping screw by which the cable end is able to be clamped to the cam disc, may also contribute to the movement coupling of the cam disc and master connecting rod or may even effect this alone.

The extent of the bearing region along the bearing track configured on the cam disc in this case depends on the operating position of the master connecting rod. Generally, the winding of a part of the displacement cable pull portion onto the displacement deflection contour will lead to an unwinding of the displacement cable pull portion from the bearing track of the cam disc and vice-versa. In an advantageous case in practice, the bearing region extends over an angular range of less than 90°.

By the use of the cam disc, the eccentricity required by the displacement deflection contour may be reduced, since firstly the cam disc as set forth above ensures a constant cable pull direction of the displacement cable pull portion relative to the master connecting rod and secondly the cam disc itself may be configured eccentrically relative to a connecting rod axis of the master connecting rod. In this case, the eccentricity of the eccentrically configured displacement deflection contour may be partially transmitted to the bearing track of the cam disc, so that with the simultaneously eccentric configuration of displacement deflection contour, on the one hand, and the bearing track of the cam disc, on the other hand, each of the two structures takes up less constructional space than if the eccentricity were to lie entirely on the part of the displacement deflection contour or even entirely on the part of the cam disc.

The derailleur mechanism may comprise a displacement cable pull portion which couples the master connecting rod, including the cam disc which is movable therewith, to the displacement deflection contour for common movement. Then a transmission of movement, which is particularly without loss, between the displacement deflection contour and the master connecting rod may be achieved in that for at least half of the common movement range of the cam disc and the displacement deflection contour it applies that a cable length of the displacement cable pull portion freely running between the cam disc and the displacement deflection contour runs independently of the respective operating rotational position of the cam disc and the displacement deflection contour, both tangentially to the bearing track of the cam disc and also tangentially to the displacement deflection contour. This condition may apply to more than 75% of the common movement range of the cam disc and the displacement deflection contour.

As already set forth above in more detail, at this point it should also be stressed that when the cam disc with its bearing track is arranged on the derailleur mechanism, the end of the displacement winding region located closer to the movement coupling device may be constructed in a simple manner by a straight line, which is tangent both to the displacement deflection contour and to the bearing track of the cam disc. Thus the transmission ratio of the cable pull transmission device may be determined as a function of the rotational position, without a displacement cable pull portion which is physically present being required therefor.

A structure taking up a particularly small amount of constructional space, with a simultaneously large movement path of the chain guide arrangement, may be achieved by the cam disc and the displacement deflection contour in each case being planar structures, wherein their extension planes enclose an angle of more than 65°, preferably of not less than 70° and enclose an angle of 90° or less, preferably of not more than 80°.

In principle, the cam disc may be rotatably mounted on any receiving component consisting of the base component and the chain guide arrangement, in particular the base component (B-knuckle) and moving part (P-knuckle), by means of a bearing component defining a connecting rod axis of the master connecting rod, for common rotation with the master connecting rod about the connecting rod axis. The receiving component may be the base component, since then the subassembly consisting of the master connecting rod and the cam disc is constructed in a manner which protrudes less.

For protecting a bearing formation of the cam disc encompassing the bearing component and/or passed through by the bearing component, a component consisting of the master connecting rod and the receiving component may have an apron which protrudes along the connecting rod axis and which runs about the connecting rod axis, and which surrounds a bearing formation of the cam disc encompassing the bearing component radially outwardly relative to the connecting rod axis. Additionally or alternatively, the cam disc may be arranged between a portion of the master connecting rod closer to the base component and the base portion, in order to shield the cam disc as far as possible from undesired external influences. A component consisting of the master connecting rod and the base component may be configured to be multi-armed, in particular two-armed, in the region of the articulation of the master connecting rod on the base component, and encompass the respective other component in the axial direction in the manner of a fork relative to the connecting rod axis on the base component side. The cam disc may be arranged axially between the at least two arms of the multi-armed component or/and between an arm of the multi-armed component and the portion of the respective other component enclosed thereby. For reasons of an effective movement guidance with at the same time a large bearing spacing, the master connecting rod is the multi-armed component which axially encompasses a portion of the base component. This type of construction, at least partially housing the cam disc, is advantageous such that the Applicant also claims specific protection for a derailleur mechanism of the type cited in the first paragraph of the present application, which at least partially shields the cam disc as described in the present paragraph against the external environment.

In order to secure the movement space of the master connecting rod in a simple and space-saving manner, with at the same time an advantageously low overall weight of the cam disc, the cam disc may have a recess which is passed through by a further bearing component which defines a connecting rod axis of the respective other connecting rod of the parallelogram connecting rod gear system, which is not the master connecting rod. Thus the further bearing component together with an edge portion of the recess may form a mechanical end stop for limiting the rotational movement of the cam disc in at least one rotational direction.

One or both of the cited bearing components may be an axle component which relative to the receiving component is immovably secured thereto. This may be an axle stub configured integrally with the receiving component or an axle pin received immovably in the receiving component.

Alternatively, one or both of the aforementioned bearing components may be a shaft component which on the parallelogram connecting rod which bears said shaft component is immovably secured relative thereto. In turn, the bearing component may be a shaft end which is configured integrally with its assigned parallelogram connecting rod or a specific shaft component, namely a pin which is connected fixedly in terms of rotation to the parallelogram connecting rod.

Depending on the design of a bicycle frame, by using a sprung rear wheel suspension the position of the cable pull transmission device relative to the part of the gear shift cable pull portion running from the bicycle frame to the gear shift deflection structure may be altered during compression and rebound. In order to prevent that the gear shift winding region generated on the gear shift deflection contour is altered solely by the compression or/and rebound, without a gear shift actuation by the bicycle rider, the cable pull securing formation may be pivotably arranged about a rocker axis relative to the base component.

For protecting the winding part of the gear shift cable pull portion bearing against the gear shift deflection contour, the derailleur may have a cable channel component which relative to the base part is immovably secured thereto and which together with the gear shift deflection contour forms a cable channel for a part of the gear shift cable pull portion received on the gear shift winding region. The cable channel may surround the part of the gear shift cable pull portion received on the gear shift winding region in the circumferential direction about the cable pull portion. In an embodiment, the cable channel surrounds the part of the gear shift cable pull portion received on the gear shift winding region along at least 330°, possibly at least 345°, along the cable circumference. For forming a cable channel which is sealed as far as possible, a portion of the gear shift deflection contour and the cable channel component may protrude into a receiving groove on the respective other portion. Since the gear shift deflection contour is movable relative to the cable component, for additional movement guidance the gear shift deflection contour may protrude into a receiving groove of the cable channel component.

A winding part of the gear shift cable pull portion bearing against the gear shift deflection contour thus may run in the cable channel which is thus formed. The cable pull securing formation may be pivotably mounted on the cable channel component such that the gear shift cable pull portion may run as directly as possible into the cable channel coming from the cable pull securing formation.

So that the cable channel may be formed and/or may remain formed independently of the respective rotational position of the cable pull transmission device, the gear shift deflection contour and the cable channel component, at least in one portion in which they bear against one another for forming the cable channel, are configured in each case with a uniform radial spacing from the rotational axis of the cable pull transmission device. Thus the gear shift deflection contour may rotate relative to the cable channel component about the rotational axis of the cable pull transmission device without the cable channel being released as a result. Only the length of the cable channel may be altered by the rotation of the gear shift deflection contour, and similarly the length of the gear shift winding region.

A path of the gear shift cable pull portion which is advantageously without tension may be obtained by the rocker axis being oriented parallel to the rotational axis of the cable pull transmission device. Additionally or alternatively, when the rocker axis passes through the cable channel, the gear shift winding region does not alter during compression or/and rebound of the sprung rear wheel or only to a negligible degree, namely by no more than 5% relative to the winding angle of the gear shift winding region in the rebound state.

For providing a compression and rebound movement without influencing the operating state of the derailleur mechanism, the cable pull securing formation, in a state ready for a gear shift operation, may pivot by approximately at least 30° between its two opposing end positions.

Structurally, the design of the base component for fastening to the bicycle may be implemented by the base component having a fastening formation, which by its shape defines a fastening axis along which a fastening component, such as a screw, wheel axle and the like, extends for fastening the base component to the bicycle. For example, the fastening formation may have one or more coaxial fastening eyes. The fastening axis may be a virtual axis passing centrally at right angles through the at least one fastening eye.

For simplifying the rebound or/and compression of a rear wheel in a rear wheel receiver on a bicycle frame of the bicycle which also bears the present derailleur mechanism, the base component and therewith the remaining derailleur mechanism, after releasing the fastening means which fasten the base component to the bicycle, may be pivotable relative to the bicycle about the aforementioned fastening axis. "Releasing" in this case does not necessarily denote a removal of the fastening means. Instead, it encompasses a loosening of the fastening means which is tightened and/or pulled tight in gear shift operation.

In order to ensure during this mounting-pivoting that a cable sheath of the gear shift cable pull portion is securely received and remains in the cable pull securing formation, according to an advantageous development the cable pull securing formation has a sliding sheath which is configured for the slidable receiving of the cable sheath. The length of the sliding sheath may correspond to the spacing of the bearing point on the base component side of the sliding sheath from the fastening axis, multiplied by at least $\pi/9$. This ensures that the base component, starting from its gear shift-ready operating position, may be pivoted by 20° from the movement path of the rear wheel to be mounted or dismantled. An even greater pivoting path of 30°, with at the same time secure reception of the cable sheath in the sliding sheath, is achieved if the length of the sliding sheath corresponds to the spacing of the bearing point on the base component side of the sliding sheath from the fastening axis, multiplied by at least $\pi/6$. The sliding sheath has a physical stop for the cable sheath from which the cable sheath may slide away in only one direction when the base component is pivoted.

For an efficient use of constructional space, without having to take up constructional space which is generally present in small amounts for component portions which are technically not required, both a gear shift deflection structure bearing the gear shift deflection contour and a displacement deflection structure bearing the displacement deflection contour extend radially outside their necessary rotary bearing formation, for the rotatable bearing on the base component, by less than 270°, preferably by less than 220°, about the rotational axis of the cable pull transmission device. Naturally, however, it is not intended to be excluded that at least one structure from the gear shift deflection structure and the displacement deflection structure also circulates fully about the rotational axis, radially outside its rotary bearing formation as a cable roller and/or cable eccentric roller.

Since the gear shift cable pull portion and the displacement cable pull portion run in different directions to the cable pull transmission device and/or away therefrom, for forming the respective deflection contours with only the minimum required extent, it is advantageous if the gear shift deflection contour and the displacement deflection contour are arranged offset to one another by a predetermined offset angle about the rotational axis. The offset in this case may be determined using the position of those regions of the deflection contours which are configured for winding up a cable of a cable pull portion.

A compact embodiment of the derailleur mechanism, which saves constructional space, combined with long displacement paths of the chain guide arrangement, may also be achieved if the connecting rod axes of the parallelogram connecting rod gear system have a spacing from the fastening axis which is different from zero but said connecting rod axes do not intersect this fastening axis. Particularly long displacement paths may be obtained with a predetermined shape of the derailleur mechanism if the connecting rod axes enclose with the fastening axis an angle ranging from 75° to 105°. The connecting rod axes may run with a spacing from the fastening axis, at right angles thereto.

Moreover, long displacement paths of the chain guide arrangement may be achieved without increasing the gear shift actuating paths of the gear shift cable pull portion by using longer parallelogram connecting rods. The bearing spacing of the connecting rod axes of the same parallelogram connecting rod may be at least 46 mm, in an embodiment at least 48 mm. This long configuration of the parallelogram connecting rods leads to problems in the transmission of force or movement. Even these problems may be reduced or even eliminated by the above-described variable transmission ratio. The present application, therefore, permits the use of the aforementioned large bearing spacing of parallelogram connecting rods without alterations to gear shift actuating devices being required thereby. These gear shift actuating devices may be reused. The bearing spacing of the parallelogram connecting rods should not be greater than 58 mm.

For the particularly secure attachment of the base component to either a dropout end of a bicycle frame or to a rear wheel axis formation of a bicycle, the base component may have at least two fastening arms arranged at a spacing from one another along the aforementioned fastening axis. This permits the particularly stable arrangement of a component of a bicycle between the fastening arms.

For forming the derailleur mechanism with a small amount of constructional space, the cable pull transmission device may be rotatably mounted on one of the two fastening arms and arranged in the region between the two fastening arms. The fastening arm rotatably mounting the cable pull transmission device may be the inner fastening arm located closer in the gear shift-ready state to a vertical bicycle longitudinal central plane.

The derailleur mechanism may have a gear shift cable pull portion running from a gear shift actuating device to the derailleur mechanism, and a displacement cable pull portion running between the displacement deflection contour and the movement coupling device. These portions may be portions of a single physical cable or may be formed in each case by a separate cable which may be secured by its longitudinal end to the cable pull transmission device located closer to the cable pull transmission device, in particular to the deflection contour assigned thereto.

Due to the gear shift deflection structure, the present derailleur mechanism permits an advantageous avoidance of a cable loop as a cable reserve in the region behind the rear wheel axis of a bicycle. Advantageously, relative to the fastening axis, the gear shift cable pull portion runs through axially between the two fastening arms and namely between the fastening axis and the articulation points of the parallelogram connecting rods on the base component side.

Embodiments of the present invention further relates to a bicycle with a rear wheel derailleur and a derailleur mechanism, as is described above, wherein the base component is arranged on the rear axis of the rear wheel or on a dropout end of the bicycle frame or/and wherein a part of the gear shift cable pull portion runs through the chainstay of the bicycle frame. The fastening axis of the base component may run parallel or coaxial to the rear wheel axis of the bicycle.

A bicycle is generally denoted by 10 in FIG. 1. Said bicycle comprises a front wheel 12 and a rear wheel 14 which in each case are connected resiliently to a frame 20 via spring devices 16 and/or 18. A bicycle rider may alter the direction of the bicycle during travel via a connecting rod 22. Moreover, the connecting rod has a gear shift actuating device 24 for shifting the gears of a rear derailleur 26.

As is usually the case, the bicycle has at least one front chain leaf 28 which may be driven in rotation by a pedal crank set 30. A circulating bicycle chain 32 is able to be brought into meshing engagement by a rear derailleur mechanism 34 with one of a plurality of pinions 36 of a rear wheel pinion cassette 38. Since the pinions 36 of the pinion arrangement 38 have different diameters, the drive ratio selected on the bicycle 10 may thus be altered by means of the derailleur mechanism 34.

Hereinafter, the derailleur mechanism 34 will be described in more detail in connection with FIGS. 2 to 8. It should be mentioned that the rough schematic view of FIG. 1 shows a derailleur mechanism 34 only as a dummy component. The structural details implemented on the derailleur mechanism 34 are exclusively to be derived from FIGS. 2 to 8. The arrow V indicates the forward direction of travel. In combination with FIGS. 2 to 5, an embodiment according to the invention of the derailleur mechanism 34 will be described hereinafter in more detail.

Figure 2:
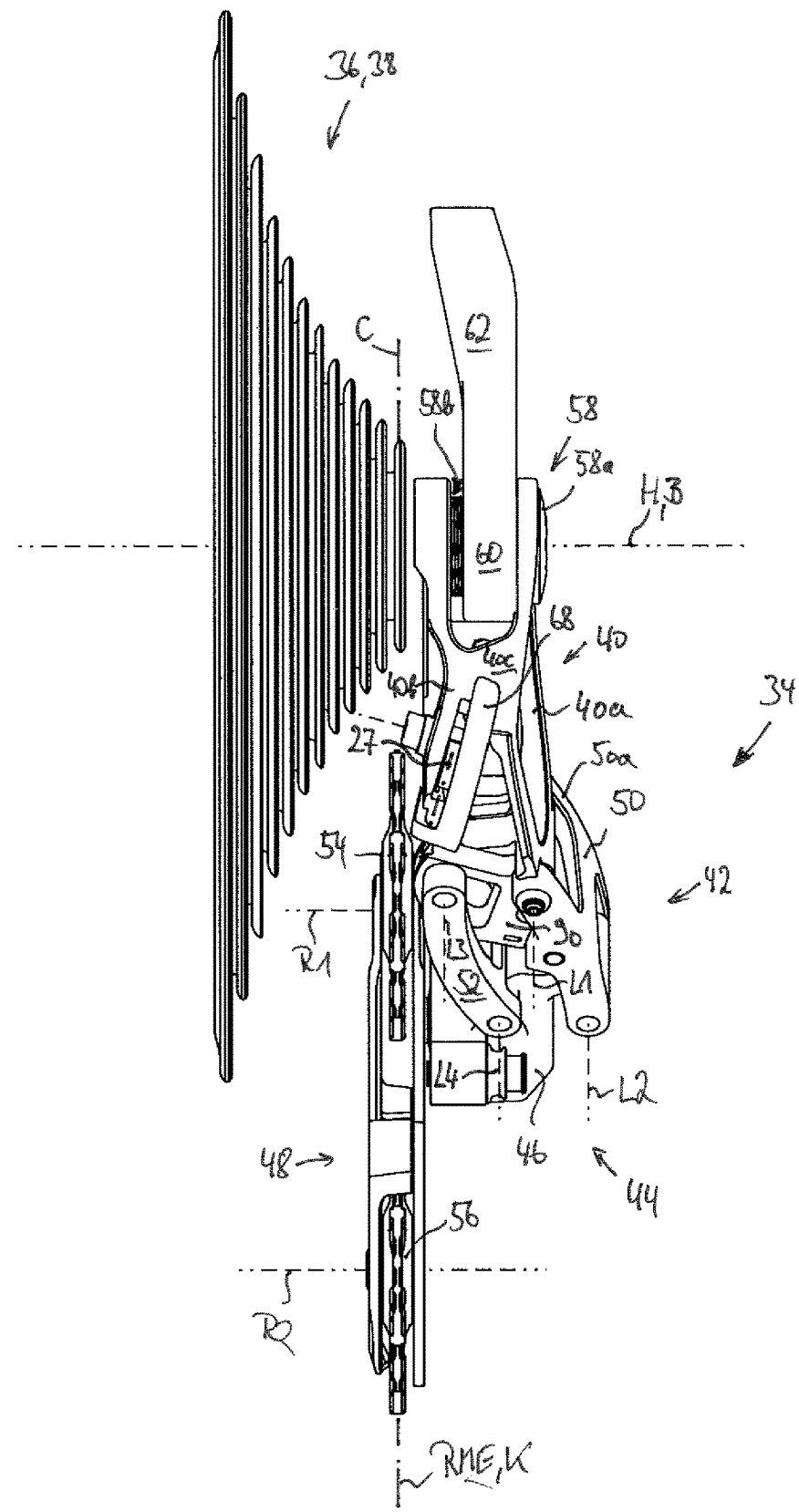
FIG. 2 shows a rough schematic detailed view of the derailleur mechanism according to an embodiment mounted on a bicycle, when viewing the bicycle in the longitudinal direction from the rear.
Figure 3:
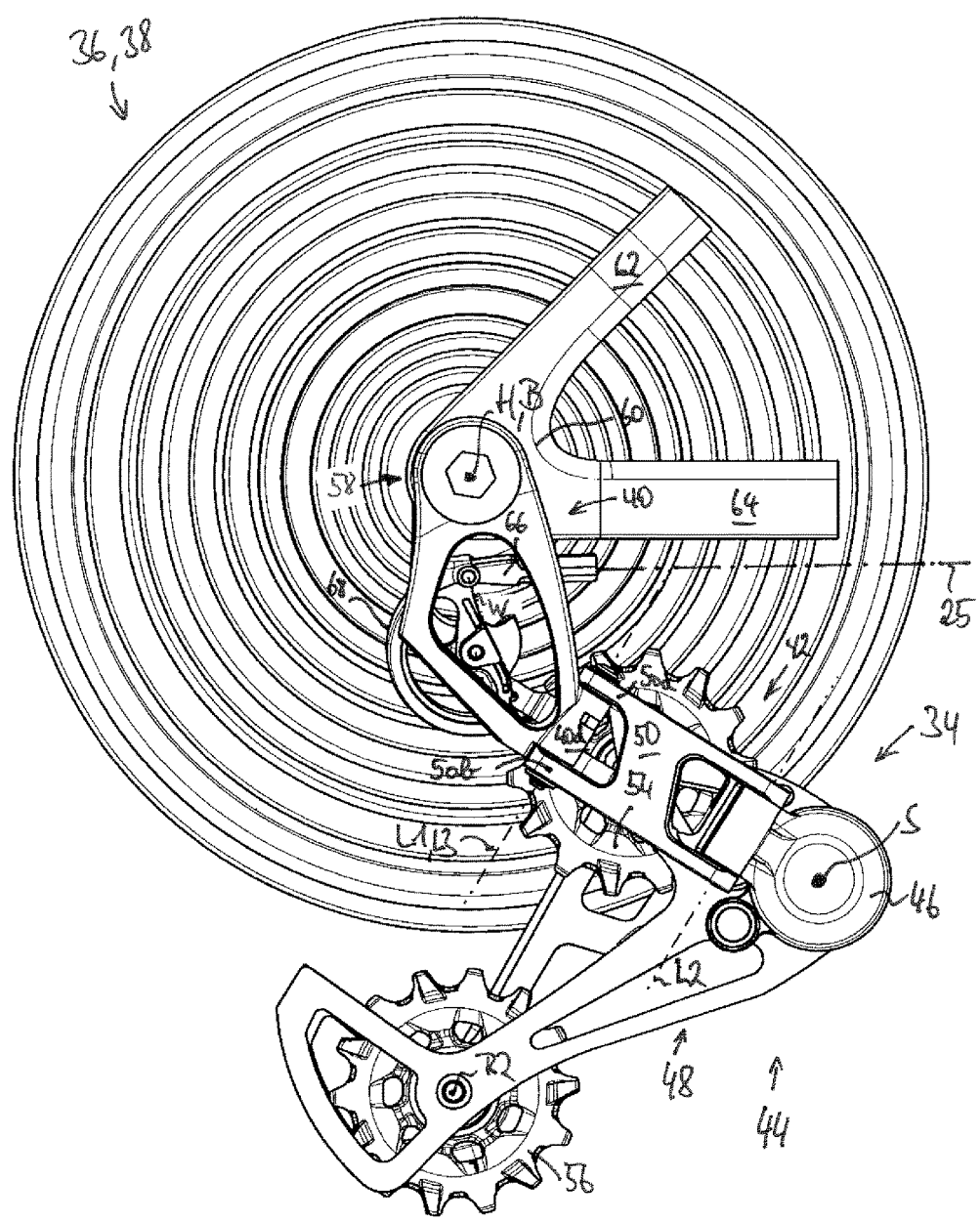
FIG. 3 shows a side view of the derailleur mechanism according to an embodiment when viewed along the rear wheel axis of the bicycle bearing the derailleur mechanism.
Figure 4:
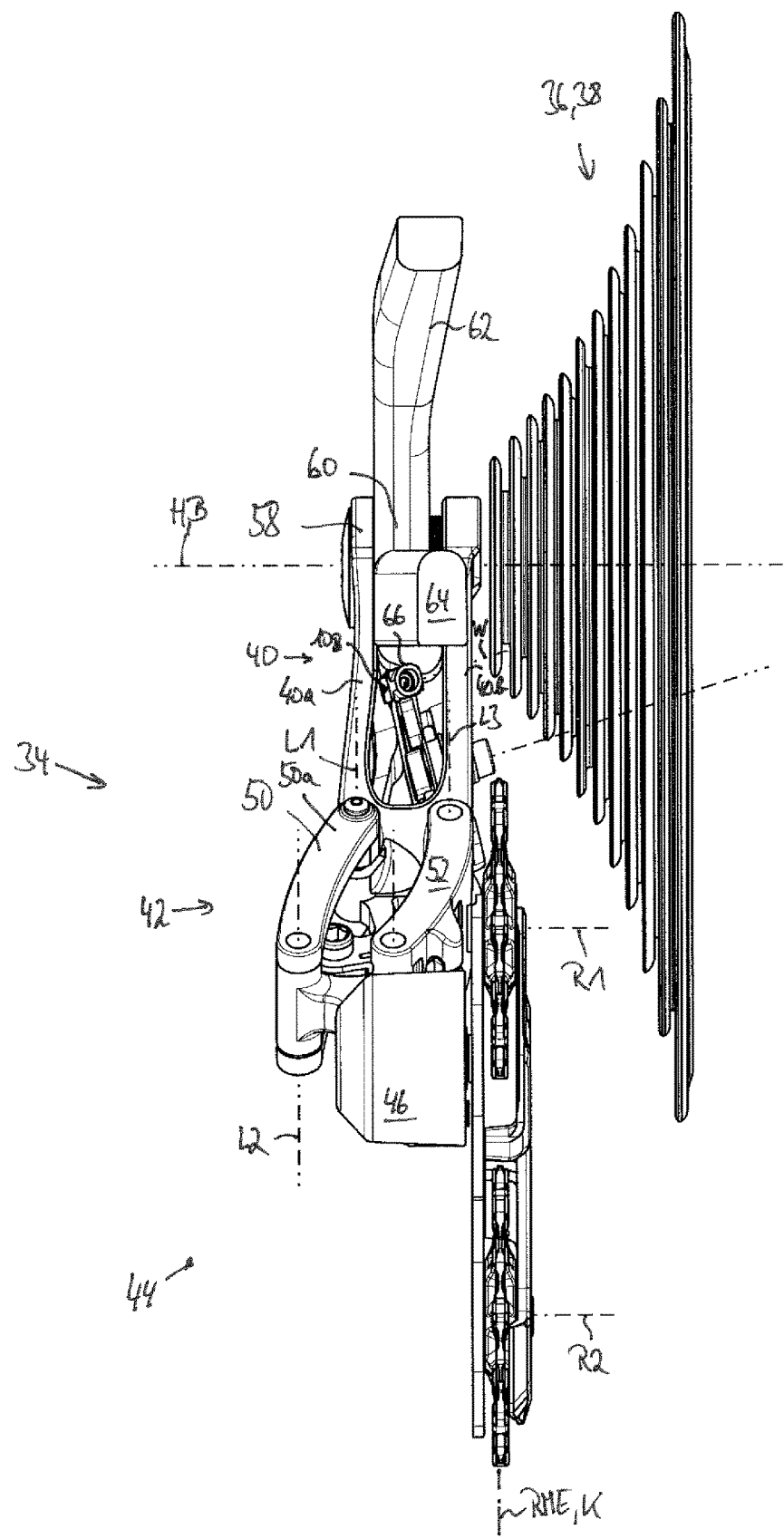
FIG. 4 shows a view of the derailleur mechanism in the bicycle longitudinal direction from the front.
Figure 5:
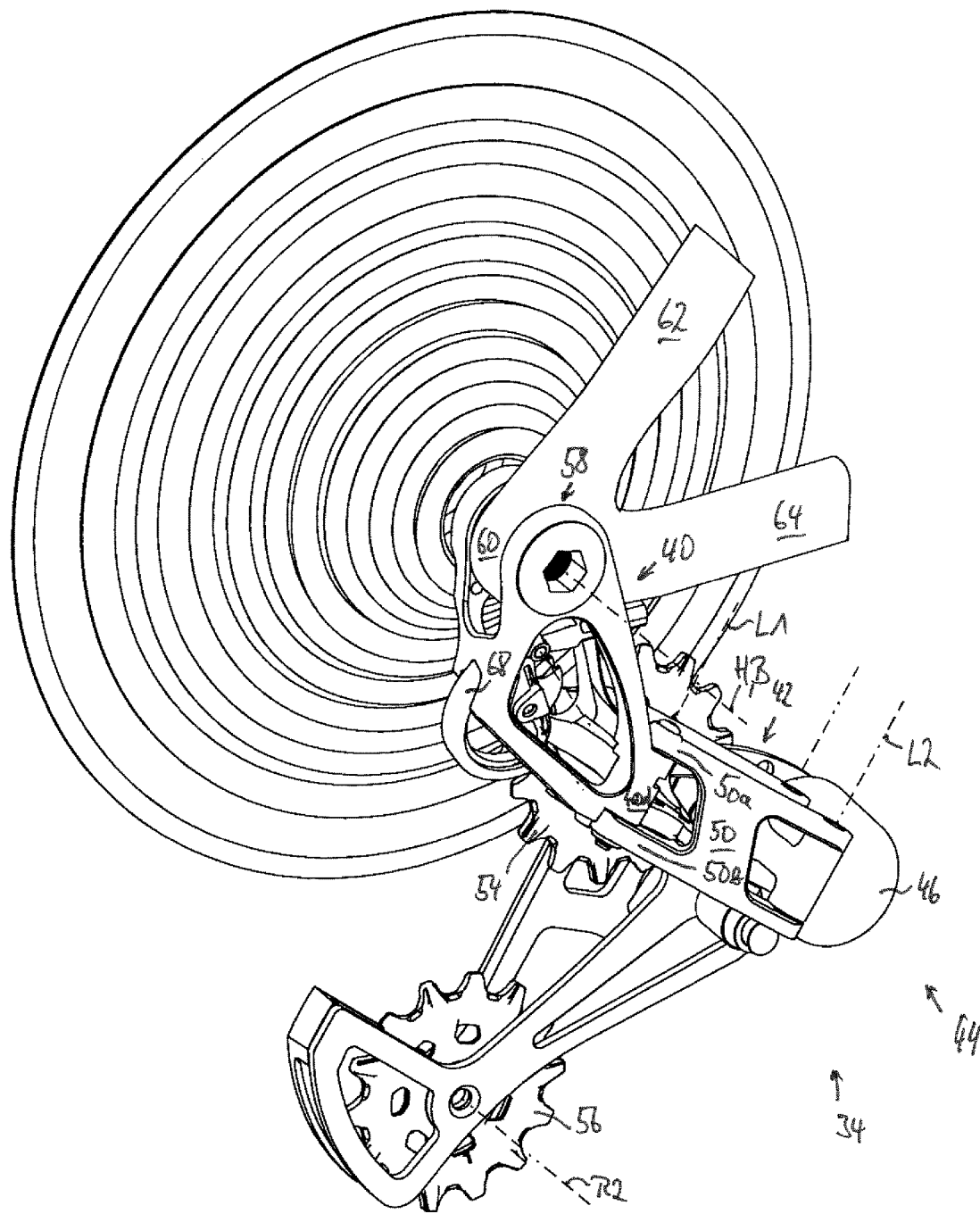
FIG. 5 shows a perspective view of the derailleur mechanism mounted on the rear axis of the bicycle, obliquely from above and obliquely from the rear (relative to the bicycle bearing the derailleur mechanism)

FIG. 2 in this case is a view of the derailleur mechanism in the longitudinal direction of the bicycle from the rear, i.e. along the arrow II of FIG. 1. FIG. 3 is a view of the derailleur mechanism 34 at right angles from the drawing plane of FIG. 1 along the rear wheel axis H of the rear wheel 14 of FIG. 1. FIG. 4 is a view of the derailleur mechanism 34 in the longitudinal direction of the bicycle from the front, i.e. along the arrow IV in FIG. 1. FIG. 5 is a perspective view of the derailleur mechanism 34 obliquely from the rear and obliquely from above.

The derailleur mechanism 34 comprises a base component 40, a movement coupling device 42 in the form of a parallelogram connecting rod gear system, which connects the base component 40 to a chain guide arrangement 44, being articulated thereto. The chain guide arrangement 44 comprises a moving part 46 connected directly to the parallelogram connecting rod gear system 42 and a chain guide 48 which is pivotable relative to the moving part 46 about a clamping axis S (see FIG. 3).

As is shown in FIG. 1, the gear shift actuating device 24 is connected to the derailleur mechanism 34 for actuating the derailleur mechanism 34 via a gear shift cable pull portion 25. By this gear shift cable pull portion 25 a bicycle rider may implement a wish to alter the gear stage produced on the rear wheel by altering the pinion 36 which is in meshed engagement with the bicycle chain 32.

On the base component 40 an outer parallelogram connecting rod 50 is pivotably articulated about a connecting rod axis L1. The moving part 46 at the longitudinal end of the parallelogram connecting rod 50 located away from the base component 40 is pivotably articulated about a connecting rod axis L2 parallel thereto. As shown in FIG. 3, the outer parallelogram connecting rod 50 in the region of its articulation on the base component 40 has an upper connecting rod arm 50a and a lower connecting rod arm 50b which axially encompass an articulated portion 40d of the base component relative to the connecting rod axis L1.

Similarly, an inner parallelogram connecting rod 52, i.e. located along the rear wheel axis H in the vicinity of the pinion cassette 38, is articulated about a connecting rod axis L3 on the base component side on the base component 40, and is articulated about a connecting rod axis L4 on the chain guide side on the moving part 46 of the chain guide arrangement 48. The connecting rod axes L1 to L4 are parallel to one another and form the edges of a virtual parallelepiped.

The connecting rod axes L1 to L4 are also oriented at right-angles to the rear wheel axis H and are provided with a spacing therefrom. In a gear shift-ready state of the derailleur mechanism 34 fully mounted on the bicycle 10, the connecting rod axes L1 to L4 are inclined by approximately 45 to 60° relative to a plane containing the rear wheel axis H, which is parallel to the horizontal supporting substrate U on which the bicycle stands.

The chain guide 48 has a chain guide roller 54 and a tensioning roller 56. The two rollers 54 and 56 are rotatable about parallel roller axes R1 and/or R2. The chain guide roller 54 in this case is the roller from which the bicycle chain 32 circulating in the forward travel-drive direction V runs toward the pinion cassette 38. The tensioning roller 56 in this case is the roller with which the bicycle chain 32, circulating in the forward travel-drive direction V and coming from the front chain leaf 28, comes into contact.

The two rollers 54 and 56 are arranged in a coplanar manner on the chain guide 48 such that a roller central plane RME at right-angles to the roller axes R1 and R2, intersecting the rollers 54 and 56 in the axial centre relative to the roller axes R1 and/or R2, is the same plane RME for both rollers 54 and 56. This common roller central plane RME of the chain guide roller 54 and tensioning roller 56 is the chain guide plane K of the chain guide 48 and/or the chain guide arrangement 44.

By means of the parallelogram connecting rod gear system 42 the chain guide plane K of the chain guide 48 may be displaced in a translatory manner, i.e. without rotation about an axis located in the chain guide plane K, along the rear wheel axis H. By the coplanar arrangement of the chain guide plane K with a pinion central plane C of a pinion 36 at right-angles to the rear wheel axis H, said pinion central plane intersecting the sprocket of a pinion 36 approximately in the axial centre thereof (relative to the rear wheel axis H), one of the twelve gear stages on the rear wheel 14, which are structurally provided by the twelve-speed pinion cassette 38, may be selected.

The derailleur mechanism 34 is received by a fastening formation 58 on a dropout end 60 of the bicycle frame 20. A seatstay 62 and a chainstay 64 of the frame 20 are connected together at this dropout end 60.

The fastening formation 58 with two fastening eyes 58a and 58b defines a fastening axis B along which the fastening formation 58 of the base component 40 is able to pass through a fastening means, such as a fastening screw, push-connection pin and the like, for fastening to the bicycle frame 20. In the fully mounted gear shift-ready state, the fastening axis B is colinear with the rear wheel axis H, or in an attachment which differs from the figures, parallel to the rear wheel axis H.

The base component 40 has an outer fastening arm 40a and an inner fastening arm 40b which may be connected so as to be reinforced by a reinforcing bridge 40c, in an embodiment on the side facing toward the bicycle rear side in the fully mounted state.

In FIG. 3 the path of the gear shift cable pull arrangement 25 coming from the gear shift actuating device 24 is shown in dashed lines. The gear shift cable pull portion 25 runs into a cable pull securing formation 66 which is pivotably articulated about a rocker axis W, on a cable channel component 68 fixed to the base component.

For the sake of improved clarity, the construction of the base component 40 with its transmission of a gear shift actuation of the gear shift actuating device 24 to the chain guide arrangement 44 is described with reference to FIGS. 6 to 8.

Figure 6:
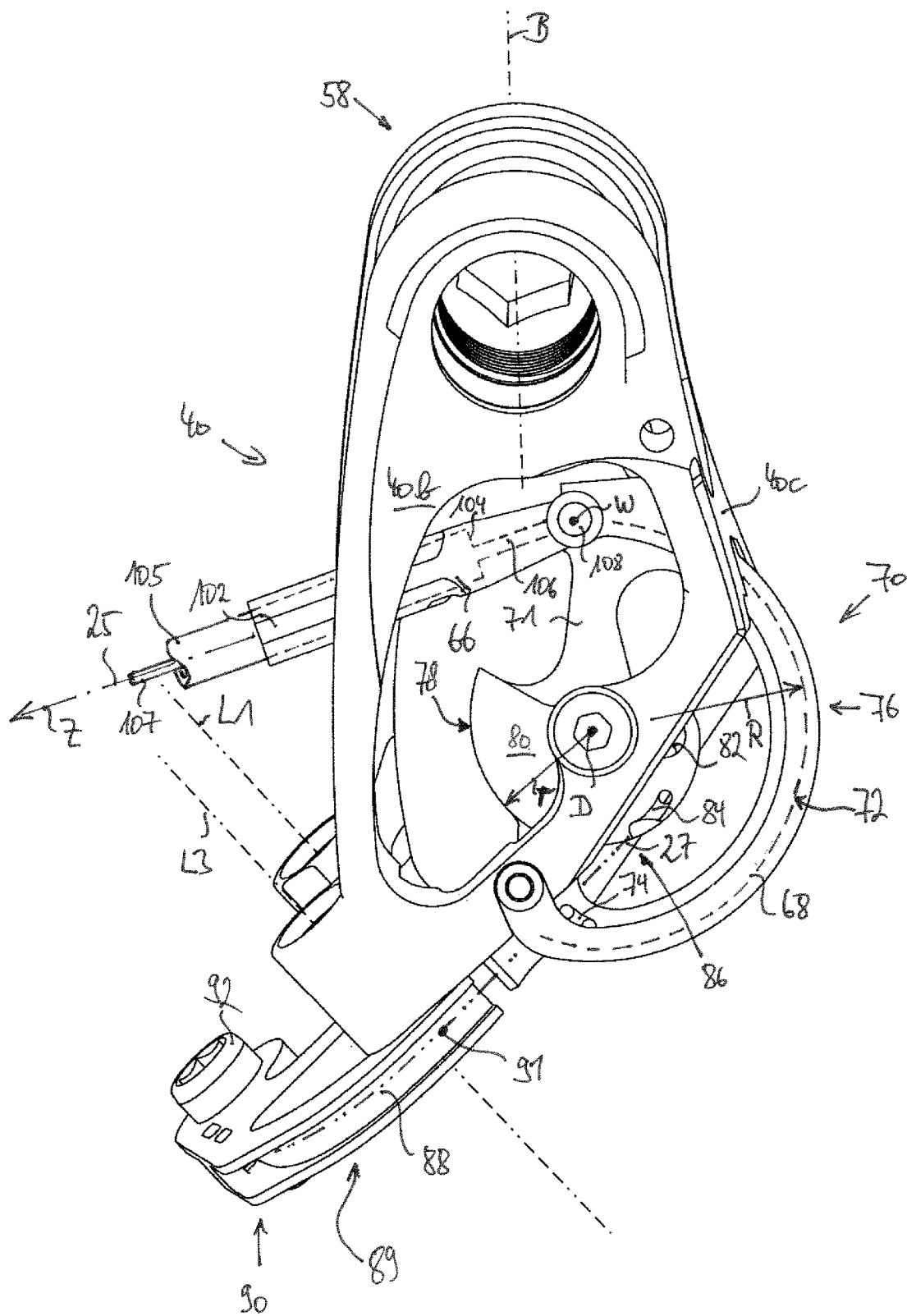
FIG. 6 shows a view of the base component with the cam disc along the rotational axis of the cable pull transmission device.
Figure 7:
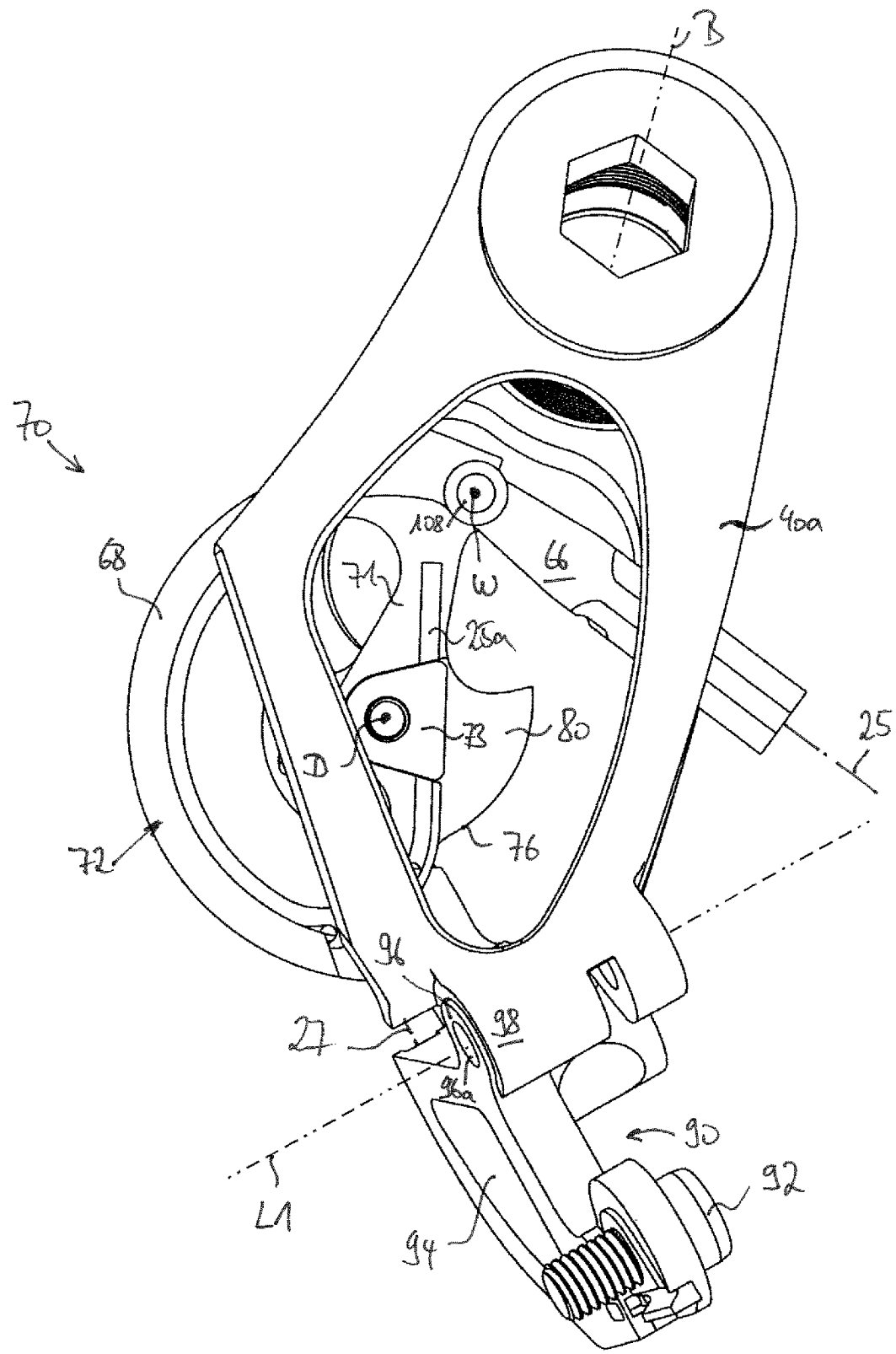
FIG. 7 shows the base component with the cam disc of FIG. 6 once again viewed along the rotational axis of the cable pull transmission device but from the opposing side relative to the view of FIG. 6.

As may be identified in particular from FIG. 6, relative to the base component 40 the cable channel component 68 is immovably connected thereto, more specifically in the example shown to the fastening arm 40b thereof. On this fastening arm 40b, a cable transmission device 70 is rotatably arranged about a rotational axis D, which is oriented at right-angles to the drawing planes of FIGS. 6 and 7. The rocker axis W runs parallel to the rotational axis D of the cable pull transmission device 70.

The cable pull transmission device 70 comprises a gear shift deflection contour 72 which extends by approximately 180° about the rotational axis D with a uniform spacing, and which protrudes into the cable channel component 68 and forms therewith a hollow space circulating as a cable channel about the rotational axis D, in which a gear shift winding region 76 is located, the gear shift cable pull portion 25 bearing against the gear shift deflection contour 72 therein. The cable channel component 68 has a U-shaped cross section which is open toward the rotational axis D and which encompasses the gear shift deflection contour 72 on three sides.

On an immobilizing formation 73, the longitudinal end of the gear shift cable pull portion 25 located closer to the cable pull transmission device 70 may be secured to the cable pull transmission device 70, namely by clamping. The gear shift deflection structure 71 comprising the gear shift deflection contour 72 has a groove 25a configured on the immobilizing formation 73, the cable of the gear shift cable pull portion 25 being able to be introduced therein.

The cable of the gear shift cable pull portion 25 runs approximately at 74 into the gear shift deflection contour 72 concealed by the cable channel component 68, and runs along the gear shift winding region 76 to approximately the location of the rocker axis W, so as to bear against the gear shift deflection contour 72.

By pulling the cable of the gear shift cable pull portion 25, the location 74 of the contact of the cable of the gear shift cable pull portion 25 with the gear shift deflection contour 72 of the immobilizing formation 73 in FIG. 6 may be displaced counterclockwise about the rotational axis D relative to the base component 40 and to the cable channel component 68 which are both connected thereto. Since the location of the rocker axis W is immovably secured to the base component 40, irrespective of a movement of the gear shift cable pull portion 25, when approaching the contact location 74 on the rocker axis W, the gear shift winding region 76 is shortened. This shortening is carried out counter to a spring pretensioning of the chain guide arrangement 44 or/and the movement coupling device 42. By dispensing cable of the gear shift cable pull portion 25, due to the described pretensioning force the gear shift deflection structure 71 is displaced clockwise with the contact location 74 in FIG. 6, and at the same time the gear shift winding region 76 is increased again.

A displacement deflection contour 78, which is configured on a displacement deflection structure 80 which bears said displacement deflection contour, is connected fixedly in terms of rotation about the rotational axis D to the gear shift deflection contour 72.

Both the gear shift deflection contour 72 and the displacement deflection contour 78 may in each case be configured as a groove-shaped recess in their respectively assigned structure 71 and/or 80, and thus guide the respectively assigned cable pull portion axially relative to the rotational axis D.

A retaining formation 82 is provided on the displacement deflection structure 80, a displacement cable pull portion 27 indicated in its path by dashed lines being able to be secured thereto. Starting from the retaining formation 82 the cable of the displacement cable pull portion 27 comes into contact approximately at 84 with the displacement deflection contour 78. In FIG. 6, therefore, the displacement cable pull portion 27 is almost fully unwound from the displacement deflection contour 78.

When viewing FIG. 6 it becomes clear that, starting from the operating position shown therein, pulling the gear shift cable pull portion 25 in the pulling direction Z effects a rotation of the cable pull transmission device 70 counterclockwise about the rotational axis D. The contact location 74 is brought closer to the rocker axis W and, as a result, the gear shift winding region 76 is significantly reduced.

The displacement deflection structure 80 which is connected fixedly in terms of rotation to the gear shift deflection structure 71 is also rotated counterclockwise and at the same time the displacement cable pull portion 27, as a function of the extent of the pulling actuation of the gear shift cable pull portion 25, is wound onto the displacement deflection contour 78. A displacement winding region 86 on the displacement deflection contour 78 is thus increased.

The cable pull transmission device 70 has in this case a transmission ratio which is a function of its rotational position. Since the gear shift deflection contour 72 circulates with a radius R of uniform size about the rotational axis D, the effective spacing of the gear shift cable pull portion 25 from the rotational axis D does not alter.

As may be identified particularly clearly from FIG. 6, however, the smaller radius r of the displacement deflection contour 78, starting from the position shown in FIG. 6, with increased rotation of the displacement deflection contour 78 counterclockwise about the rotational axis D initially reduces to a minimum value and then increases again. The angular range over which the radius r reduces, starting from the position shown in FIG. 6, in this case is significantly smaller than the angular range adjacent thereto in the counterclockwise direction, in which the radius r becomes larger again. The angular range about the rotational axis D, in which the radius r increases as it progresses away from the retaining formation 82 of the displacement cable pull portion 27, may be at least three times, in an embodiment at least four times, as large as the angular range located closer in the retaining formation 82, in which the radius r reduces. The displacement deflection contour 78 is eccentric relative to the rotational axis D and namely eccentric such that its radius r, with an increased angular spacing from the contact location 84 closest to the retaining formation 82 as described above, initially decreases and then increases again. In other words, this means that the radius r of the displacement deflection contour 78, starting from a minimum displacement winding region 86, initially decreases and then increases with an increasing displacement winding region 86. The radial spacing for calculating the dependent transmission ratio, as a function of the respective operating position of the cable pull transmission device 70, is the radial spacing of the displacement deflection contour 78 at the location at which the displacement cable pull portion 27 runs from the displacement deflection contour 78 to the movement coupling device 42, i.e. the longitudinal end of the displacement winding region 86 located closer to the movement coupling device 42.

The displacement cable pull portion 27 runs tangentially away from the displacement deflection contour 78 and also tangentially to a bearing track 88 of a cam disc 90.

The cam disc 90 is connected for common rotation by means of a screw 92 to the outer parallelogram connecting rod 50, for the common pivoting movement about the connecting rod axis L1. Not only is the connection with the outer parallelogram connecting rod 50 able to be produced by means of the screw 92 but also the cable end of the displacement cable pull portion 27 located remotely from the displacement deflection structure 80 is able to be clamped thereby. Due to the direct connection, which is thus able to be produced of the displacement cable pull portion 27 with the outer parallelogram connecting rod 50, this parallelogram connecting rod acts as a master connecting rod 50.

Figure 8:
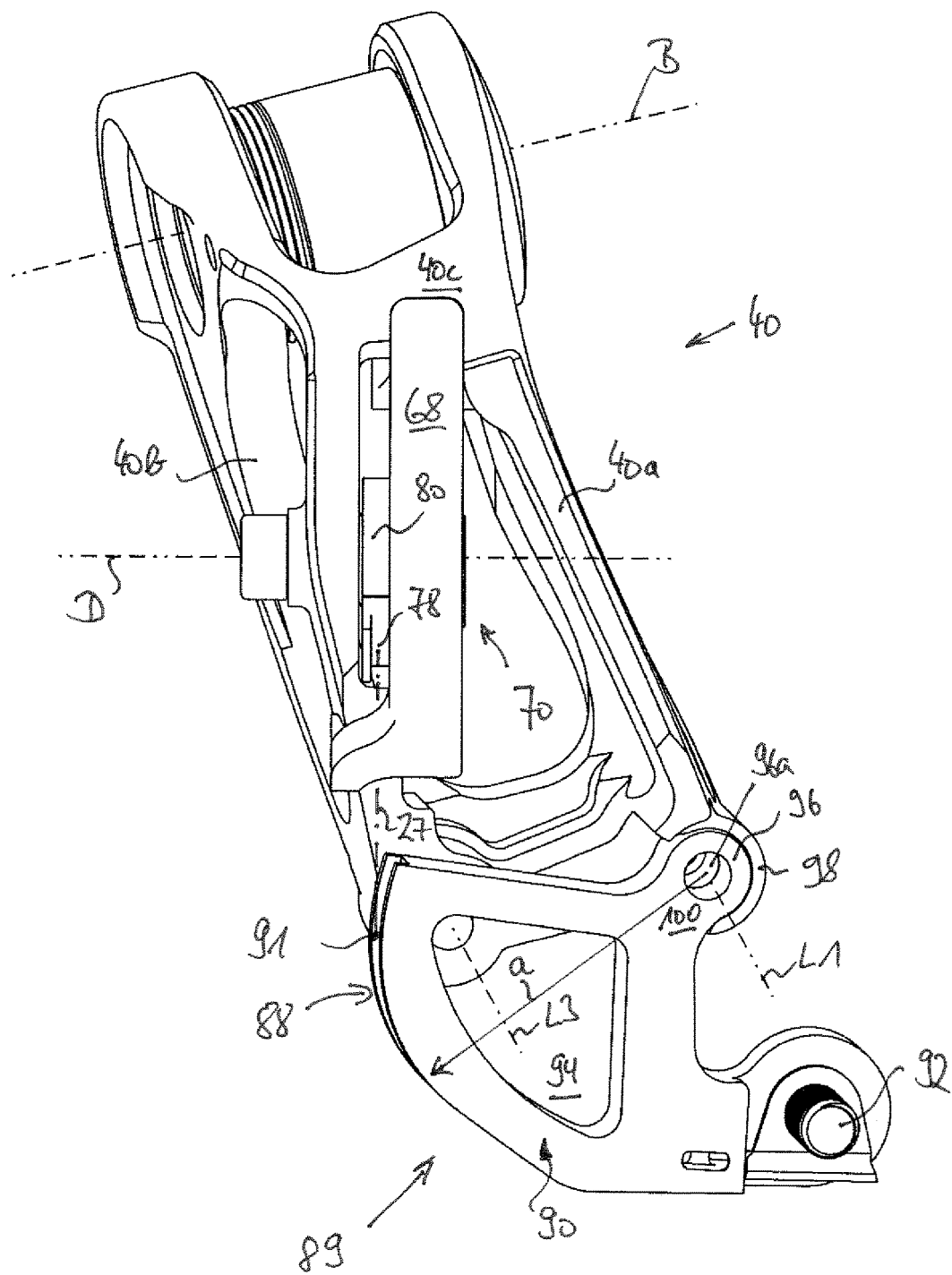
FIG. 8 shows the base component with the cam disc of FIGS. 6 and 7 when viewed at right angles to the rotational axis of the cable pull transmission device.

As may be identified primarily in FIG. 8, the cam disc 90 has a recess 94 which is passed through by a pin defining the connecting rod axis L3 as an axle component (not shown). As a result, an edge of the recess 94 serves as a mechanical end stop for limiting the pivoting movement of the cam disc 90 about the connecting rod axis L1 and thus also for limiting the pivoting movement of the outer parallelogram connecting rod 50.

A bearing formation 96 of the cam disc 90 (see FIGS. 7 and 8) has an opening 96a which is passed through by an axle component defining the connecting rod axis L1, namely a pin or shaft stump. Thus the same component which defines the connecting rod axis L1 of the outer parallelogram connecting rod 50 L1 may also define the pivot axis of the cam disc 90.

Only the bearing formation 96 surrounds the connecting rod axis L1 in a region located radially close to the connecting rod axis L1. The part of the bearing track 88 located further radially outwards extends only along a sector about the connecting rod axis L1 which is actually required for the bearing of the displacement cable pull portion 27 in the bearing region 89 of the bearing track 88 against the cam disc 90. This bearing region 89 extends from the clamping of the longitudinal end of the displacement cable pull portion 27 located closer to the master connecting rod 50, about the connecting rod axis L1 to the location 91 at which the displacement cable pull portion 27 lifts away from the bearing track 88 tangentially to the displacement deflection structure 80. The location 91 thus specifies the end of the bearing region 89 located closest to the cable pull transmission device 70.

The bearing track 88 is also configured eccentrically relative to the connecting rod axis L1 about which it circulates, i.e. the spacing a of the bearing track 88 (see FIG. 8) from the connecting rod axis L1 alters along the circumference about the connecting rod axis L1. Thus the eccentricity of the deflection of the displacement cable pull portion 27, which is advantageous for the kinematics of the master connecting rod 50, may be distributed to two components, namely to the displacement deflection structure 80 and to the cam disc 90. Thus each of these components 80 and 90 may be designed to be smaller than might be the case if each of these components had to produce the eccentricity of the deflection of the displacement cable pull portion 27 alone.

By the rigid connection of the cam disc 90 and master connecting rod 50 the cable end of the displacement cable pull portion 27 located closer to the movement coupling device 42, irrespective of the respective operating position of the master connecting rod 50, always runs with the same lead-in angle to the master connecting rod 50. The torque effected by a predetermined cable pulling force of the displacement cable pull portion 27 on the master connecting rod 50, about the connecting rod axis L1, therefore, is irrespective of the operating position of the master connecting rod 50.

It should be expressly mentioned here that whilst the cable pull portions 25 and 27 are present on the gear shift-ready derailleur mechanism 34, it is sufficient merely for a tangent to be applied once by the gear shift deflection contour 72 relative to the rocker axis W of the cable pull securing formation 66 and once by the displacement deflection contour 78 relative to the bearing track 88 of the cam disc 90, in order to determine the above-described advantageous spatial assignments of the relevant components, even without the cable pull portions actually being present.

The bearing formation 96 is protected from external mechanical influences by an apron 98 which protrudes in one piece from the remaining base component 40, and which surrounds the bearing formation 96 by at least 160°, in an embodiment by at least 180°. The apron 98 may be configured to be partially cylindrical or partially frustoconical. In the fully mounted state the bearing formation 96 of the cam disc 90, relative to the connecting rod axis L1, is axially housed between the base component 40 and the outer parallelogram connecting rod 50, more specifically between the articulated portion 40d and the lower connecting rod arm 50b, and radially housed by the apron 98 of the base component 40. Only the arm portion 100 of the cam disc 90, protruding from the bearing formation 96 relative to the bearing track 88, protrudes out of the described housing radially relative to the connecting rod axis L1.

Both the displacement deflection contour 78 and the bearing track 88 in each case are planar structures. Their respective extension planes are oriented at right-angles to their respective rotational movement axis, i.e. at right-angles to the rotational axis D and again at right-angles to the connecting rod axis L1. The same applies to the displacement deflection structure 80 bearing the displacement deflection contour 78, and the cam disc 90 bearing the bearing track 88. The extension planes of the aforementioned structures enclose an angle of between 65 and 90°.

The cable pull securing formation 66, which is pivotable about the rocker axis W relative to the cable channel component 68 by approximately 30°, has a sliding sheath 102 which extends from the longitudinal end located remotely from the cable channel component 68 to a stop 104 for a cable sheath 105 of the gear shift cable pull portion 25. Starting from the stop 104 a through-opening 106 leads to the longitudinal end of the cable pull securing formation 66 located closer to the cable channel component 68. The cable 107 of the gear shift cable pull portion 25, but not the cable sheath 105 thereof, may pass through this through-opening 106. However, in the gear shift-ready operating state of the derailleur mechanism 34 the cable sheath 105 bears against the stop 104 and is able to be lifted away from said stop.

For dismantling the rear wheel 14 from the frame 20, a fastening means passing through the base component 40 along the fastening axis B may be released until the base component 40 and thus the entire derailleur mechanism 34 is able to be pivoted about the fastening axis B which in the present case coincides with the rear wheel axis H. For assisting a dismantling of the rear wheel 14 from the frame 20, in order to ensure that the derailleur mechanism 34 may be pivoted by an angle φ (when viewing FIG. 1 clockwise) without the cable sheath 105 of the gear shift cable pull portion 25 slipping out of the sliding sheath 102, the length of the sliding sheath 102 from the longitudinal end located remotely from the cable channel component 68 to the stop 104 is the amount according to at least the product of the spacing of the bearing point 108 of the sliding sheath 102 on the base component side from the fastening axis B and/or the rear wheel axis H, multiplied by the angle φ in the radian measure, wherein φ is at least π/9, and in an embodiment is at least π/6.

In an embodiment, a derailleur mechanism (34) for a rear wheel derailleur (26) of a bicycle (10) is provided. The derailleur mechanism may include a base component (40) which is configured to be immovably fastened to a bicycle (10) relative to the bicycle frame (20) during its intended gear shift operation, a movement coupling device (42) and a chain guide arrangement (44) which is displaceably coupled to the base component (40) by means of the movement coupling device (42) in a translatory manner relative to the base component (40), a cable pull securing formation (66) which is configured for supporting a cable sheath (105) and for passing through a cable of a gear shift cable pull portion (25) running from a gear shift actuating device (24) to the derailleur mechanism (34), a cable pull transmission device (70) which is rotatably arranged about a rotational axis (D) on the base component (40), wherein the cable pull transmission device (70) has a gear shift deflection contour (72) which surrounds the rotational axis (D) with a larger radial spacing (R) and has a displacement deflection contour (78) which surrounds the rotational axis (D) with a smaller radial spacing (r), wherein the gear shift deflection contour (72) and the displacement deflection contour (78) are connected together for common rotational movement about the rotational axis (D), wherein the gear shift deflection contour (72) is configured to receive the gear shift cable pull portion (25) so as to bear along a gear shift winding region (76) and wherein the displacement deflection contour (78) is configured to receive a displacement cable pull portion (25) running between the displacement deflection contour (78) and the movement coupling device (42) so as to bear along a displacement winding region (86), characterized in that the larger radial spacing (R) or/and the smaller radial spacing (r) has a non-uniform value over the respective winding region (76, 86), so that the cable pull transmission device (70), over its rotational angular range about the rotational axis (D) which is effective during operation, provides a variable transmission ratio as a function of the rotational position of the cable pull transmission device (70) relative to the base component (40).

The derailleur mechanism may also be characterized in that the displacement deflection contour (78) extends eccentrically about the rotational axis (D) such that the radial spacing (r) of the displacement deflection contour (78), starting from a minimum displacement winding region (86), with an increasing winding angle of the displacement winding region (86) reduces to a minimum value of the smaller radius (r), and starting therefrom becomes larger again, wherein the location of the minimum value of the smaller radius (r) may be located closer to a longitudinal end of the displacement winding region (86) located more remotely from the movement coupling device (42) than to the longitudinal end of the displacement winding region (86) located closer to the movement coupling device (42).

The derailleur mechanism may also be characterized in that the movement coupling device (42) comprises a parallelogram connecting rod gear system (42) with two parallelogram connecting rods (50, 52) which in each case have an articulated region on the base component side and an articulated region on the chain guide side, wherein each parallelogram connecting rod (50, 52) is pivotably connected to the base component (40) at its articulated region on the base component side about a base-connecting rod axis (L1, L3), and is pivotably connected to the chain guide arrangement (44) at its articulated region on the chain guide side about a chain guide connecting rod axis (L2, L4), wherein the derailleur mechanism (34) has a cam disc (90) which is connected to one of the parallelogram connecting rods (50, 52) as the master connecting rod (50) for common movement, wherein the cam disc (90) is configured to guide a cable end of the displacement cable pull portion (27), coupled to the master connecting rod (50) for common movement, away from the master connecting rod (50) along a bearing region (89) so as to bear against a bearing track (88) configured on the cam disc (90).

The derailleur mechanism may also be characterized in that it comprises a displacement cable pull portion (27) which couples the master connecting rod (50) to the displacement deflection contour (78) for common movement, wherein for at least half of the common movement range of the cam disc (90) and the displacement deflection contour (78) it applies that a cable length of the displacement cable pull portion (27), freely running between the cam disc (90) and the displacement deflection contour (78), runs independently of the respective operating rotational position of the cam disc (90) and the displacement deflection contour (78) both tangentially to the bearing track (88) of the cam disc (90) and tangentially to the displacement deflection contour (78).

The derailleur mechanism may also be characterized in that the cam disc (90) and the displacement deflection contour (78) in each case are planar structures, wherein their extension planes enclose an angle of more than 65°, preferably of not less than 70°, and enclose an angle of 90° or less, preferably of not more than 80°.

The derailleur mechanism may also be characterized in that the cam disc (90) is rotatably mounted on a receiving component consisting of the base component (40) and the chain guide arrangement (44) by means of a bearing component defining a connecting rod axis (L1) of the master connecting rod (50) for common rotation with the master connecting rod (50) about the connecting rod axis (L1), wherein the cam disc (90) is preferably arranged axially relative to the connecting rod axis (L1) between a portion of the base component (40) and the master connecting rod (50) or/and wherein preferably a component consisting of the master connecting rod (50) and the receiving component has an apron (98) which protrudes along the connecting rod axis (L1) and which runs about the connecting rod axis (L1) and which surrounds a bearing formation of the cam disc (90) encompassing the bearing component (96) radially outwardly relative to the connecting rod axis (L1).

The derailleur mechanism may also be characterized in that the cam disc (90) has a recess (94) which is passed through by a further bearing component which defines a connecting rod axis (L3) of the other respective connecting rod (52) of the parallelogram connecting rod gear system (42), which is not the master connecting rod (50), wherein the further bearing component together with an edge portion of the recess (94) forms a mechanical end stop for limiting the rotational movement of the cam disc (90) in at least one rotational direction.

The derailleur mechanism may also be characterized in that the cable pull securing formation (66) is pivotably arranged about a rocker axis (W) relative to the base component (40).

The derailleur mechanism may also be characterized in that it has a cable channel component (68) which relative to the base component (40) is immovably secured thereto and which together with the gear shift deflection contour (72) forms a cable channel for a part of the gear shift cable pull portion (25) received on the gear shift winding region (76), wherein the cable pull securing formation (66) is pivotably mounted on the cable channel component (68).

The derailleur mechanism may also be characterized in that the rocker axis (W) is oriented parallel to the rotational axis (D) or/and passes through the cable channel.

The derailleur mechanism may also be characterized in that for fastening to the bicycle (10) the base component (40) has a fastening formation (58) which defines a fastening axis (B), along which a fastening component such as a screw, wheel axle and the like, extends for fastening the base component (40) to the bicycle (10), wherein the cable pull securing formation (66) has a sliding sheath (102) which is configured for receiving the cable sheath (105), wherein the length of the sliding sheath (102) corresponds to the spacing of a bearing point of the sliding sheath (102) from the fastening axis, multiplied by at least π/9.

The derailleur mechanism may also be characterized in that both a gear shift deflection structure (71) bearing the gear shift deflection contour (72) and a displacement deflection structure (80) bearing the displacement deflection contour (78) extend by less than 270°, preferably by less than 220° about the rotational axis (D).

The derailleur mechanism may also be characterized in that the gear shift deflection contour (72) and the displacement deflection contour (78) are arranged offset relative to one another about a predetermined offset angle about the rotational axis (D).

The derailleur mechanism may also be characterized in that the base component (40) has a fastening formation (58) for fastening to the bicycle (10), which defines a fastening axis (B) along which a fastening component such as a screw, wheel axle and the like, extends for fastening the base component (40) to the bicycle (10), wherein the connecting rod axes (L1, L2, L3, L4) have a spacing from the fastening axis (B) which is different from zero and with the fastening axis (B) enclose an angle ranging from 75° to 105°.

The derailleur mechanism may also be characterized in that the base component (40) for fastening to the bicycle (10) has a fastening formation (58) which defines a fastening axis (B), along which a fastening component such as a screw, wheel axle and the like, extends for fastening the base component (40) to the bicycle (10), wherein the base component (40) has at least two fastening arms (40a, 40b) arranged at a spacing from one another along the fastening axis (B), wherein the cable pull transmission device (70) is rotatably mounted on one of the two fastening arms (40b) and is arranged in the region between the two fastening arms (40a, 40b).

The derailleur mechanism may also be characterized in that it has a gear shift cable pull portion (25) running from a gear shift actuating device (24) to the derailleur mechanism (34) and a displacement cable pull portion (27) running between the displacement deflection contour (78) and the movement coupling device (42).

In an embodiment, a bicycle (10) includes a rear wheel derailleur (26) and has a derailleur mechanism (34) as described herein. The derailleur mechanism may include a base component (40) that is arranged on the rear axis (H) of the rear wheel (14) or on a dropout end (60) of the bicycle frame (20) and/or wherein a part of the gear shift cable pull portion (25) runs through the chainstay (64) of the bicycle frame.

An embodiment of the invention relates to a derailleur mechanism for a rear wheel derailleur of a bicycle. The derailleur mechanism may include a base component which is configured to be immovably fastened to a bicycle relative to the bicycle frame during its intended gear shift operation, a movement coupling device, and a chain guide arrangement which is displaceably coupled to the base component by means of the movement coupling device in a translatory manner relative to the base component, a cable pull securing formation which is configured for supporting a cable sheath and for passing through a cable of a gear shift cable pull portion running from a gear shift actuating device to the derailleur mechanism, a cable pull transmission device which is rotatably arranged about a rotational axis on the base component, wherein the cable pull transmission device has a gear shift deflection contour which surrounds the rotational axis with a larger radial spacing and has a displacement deflection contour which surrounds the deflection axis with a smaller radial spacing, wherein the gear shift deflection contour and the displacement deflection contour are connected together for common rotational movement about the rotational axis, wherein the gear shift deflection contour is configured to receive the gear shift cable pull portion so as to bear along a gear shift winding region, and wherein the displacement deflection contour is configured to receive a displacement cable pull portion running between the displacement deflection contour and the movement coupling device, so as to bear along a displacement winding region.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A derailleur mechanism for a rear wheel derailleur of a bicycle, comprising:
    a base component which is configured to be immovably fastened to a bicycle relative to a bicycle frame during its intended gear shift operation,
    a movement coupling device and a chain guide arrangement which is displaceably coupled to the base component by means of the movement coupling device in a translatory manner relative to the base component,
    a cable pull securing formation which is configured for supporting a cable sheath and for passing a cable of a gear shift cable pull portion through the cable pull securing formation running from a gear shift actuating device to the derailleur mechanism, and
    a cable pull transmission device which is rotatably arranged about a rotational axis on the base component,
    wherein the cable pull transmission device has a gear shift deflection contour which surrounds the rotational axis with a larger radial spacing and has a displacement deflection contour which surrounds the rotational axis with a smaller radial spacing, wherein the gear shift deflection contour and the displacement deflection contour are connected together for common rotational movement about the rotational axis,
    wherein the gear shift deflection contour is configured to receive the gear shift cable pull portion so as to bear along a gear shift winding region and the displacement deflection contour is configured to receive a displacement cable pull portion running between the displacement deflection contour and the movement coupling device so as to bear along a displacement winding region, and
    wherein in that the larger radial spacing or the smaller radial spacing has a non-uniform value over the respective winding region, so that the cable pull transmission device, over its rotational angular range about the rotational axis which is effective during operation, provides a variable transmission ratio as a function of the rotational position of the cable pull transmission device relative to the base component.

2. The derailleur mechanism of claim 1, wherein the displacement deflection contour extends eccentrically about the rotational axis such that the smaller radial spacing of the displacement deflection contour, starting from a minimum displacement winding region, with an increasing winding angle of the displacement winding region reduces to a minimum value of the smaller radial spacing, and starting therefrom becomes larger again.

3. The derailleur mechanism of claim 2, wherein the location of the minimum value of the smaller radial spacing is located closer to a longitudinal end of the displacement winding region located more remotely from the movement coupling device than to the longitudinal end of the displacement winding region located closer to the movement coupling device.

4. The derailleur mechanism of claim 2, wherein the movement coupling device comprises a parallelogram connecting rod gear system with two parallelogram connecting rods which in each case have an articulated region on the base component side and an articulated region on the chain guide side, wherein each parallelogram connecting rod is pivotably connected to the base component at its articulated region on the base component side about a base-connecting rod axis, and is pivotably connected to the chain guide arrangement at its articulated region on the chain guide side about a chain guide connecting rod axis,
wherein the derailleur mechanism has a cam disc which is connected to one of the parallelogram connecting rods as a master connecting rod for common movement, wherein the cam disc is configured to guide a cable end of the displacement cable pull portion, coupled to the master connecting rod for common movement, away from the master connecting rod along a bearing region so as to bear against a bearing track configured on the cam disc.

5. The derailleur mechanism of claim 4, further comprising the displacement cable pull portion which couples the master connecting rod to the displacement deflection contour for common movement, wherein for at least half of the common movement range of the cam disc and the displacement deflection contour it applies that a cable length of the displacement cable pull portion, freely running between the cam disc and the displacement deflection contour, runs independently of the respective operating rotational position of the cam disc and the displacement deflection contour both tangentially to the bearing track of the cam disc and tangentially to the displacement deflection contour.

6. The derailleur mechanism of claim 5, wherein the cam disc and the displacement deflection contour are planar structures having extension planes oriented at right-angles to their respective rotational movement axis, wherein their extension planes enclose an angle between 65° and 90°.

7. The derailleur mechanism of claim 6, wherein their extension planes enclose an angle of between 70° and 80°.

8. The derailleur mechanism of claim 4, wherein the cam disc is rotatably mounted on a receiving component consisting of the base component and the chain guide arrangement by means of a bearing component defining a connecting rod axis of the master connecting rod for common rotation with the master connecting rod about the connecting rod axis, wherein the cam disc is preferably arranged axially relative to the connecting rod axis between a portion of the base component and the master connecting rod.

9. The derailleur mechanism of claim 8, further comprising a component consisting of the master connecting rod and the receiving component has an apron which protrudes along the connecting rod axis and which runs about the connecting rod axis and which surrounds a bearing formation of the cam disc encompassing the bearing component radially outwardly relative to the connecting rod axis.

10. The derailleur mechanism of claim 4, wherein the cam disc has a recess which is passed through by a further bearing component which defines a connecting rod axis of the other respective connecting rod of the parallelogram connecting rod gear system, which is not the master connecting rod, wherein the further bearing component together with an edge portion of the recess forms a mechanical end stop for limiting the rotational movement of the cam disc in at least one rotational direction.

11. The derailleur mechanism of claim 4, wherein the base component has a fastening formation for fastening to the bicycle, which defines a fastening axis along which a fastening component that is a screw or a wheel axle, extends for fastening the base component to the bicycle, wherein the connecting rod axes have a spacing from the fastening axis which is different from zero and with the fastening axis enclose an angle ranging from 75° to 105°.

12. The derailleur mechanism of claim 1, wherein the cable pull securing formation is pivotably arranged about a rocker axis relative to the base component.

13. The derailleur mechanism of claim 12, further comprising a cable channel component which relative to the base component is immovably secured thereto and which together with the gear shift deflection contour forms a cable channel for a part of the gear shift cable pull portion received on the gear shift winding region, wherein the cable pull securing formation is pivotably mounted on the cable channel component.

14. The derailleur mechanism of claim 13, wherein the rocker axis is oriented parallel to the rotational axis.

15. The derailleur mechanism of claim 13, wherein the rocker axis passes through the cable channel.

16. The derailleur mechanism of one of claim 1, further comprising a fastening formation of the base component for fastening to the bicycle, the fastening formation defining a fastening component that is a screw or a wheel axle, extends for fastening the base component to the bicycle, wherein the cable pull securing formation has a sliding sheath which is configured for receiving the cable sheath, wherein the length of the sliding sheath corresponds to a spacing of a bearing point of the sliding sheath from the fastening axis, multiplied by at least $\pi/9$.

17. The derailleur mechanism of claim 1, further comprising a gear shift deflection structure bearing the gear shift deflection contour and a displacement deflection structure bearing the displacement deflection contour extend by less than 270°.

18. The derailleur mechanism of claim 17, further comprising the gear shift deflection structure bearing the gear shift deflection contour and the displacement deflection structure bearing the displacement deflection contour extend by less than 220°.

19. The derailleur mechanism of claim 1, wherein the gear shift deflection contour and the displacement deflection contour are arranged offset relative to one another about a predetermined offset angle about the rotational axis.

20. The derailleur mechanism of claim 1, wherein the base component for fastening to the bicycle has a fastening formation which defines a fastening axis, along which a fastening component that is a screw or a wheel axle, extends for fastening the base component to the bicycle, wherein the base component has at least two fastening arms arranged at a spacing from one another along the fastening axis, wherein the cable pull transmission device is rotatably mounted on one of the two fastening arms and is arranged in the region between the two fastening arms.

21. A bicycle having a rear wheel derailleur and comprising a derailleur mechanism according to claim 17, wherein the base component is arranged on the rear axis of the rear wheel or on a dropout end of the bicycle frame.

22. The bicycle of claim 21, wherein a part of the gear shift cable pull portion runs through a chainstay of the bicycle frame.

* * * * *